(12) United States Patent
Holmström

(10) Patent No.: US 8,512,836 B2
(45) Date of Patent: Aug. 20, 2013

(54) PACKAGING MATERIAL COMPRISING MAGNETISABLE PORTIONS

(75) Inventor: Gert Holmström, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 13/322,611

(22) PCT Filed: May 5, 2010

(86) PCT No.: PCT/SE2010/000122
§ 371 (c)(1),
(2), (4) Date: Nov. 28, 2011

(87) PCT Pub. No.: WO2010/138049
PCT Pub. Date: Dec. 2, 2010

(65) Prior Publication Data
US 2012/0070634 A1    Mar. 22, 2012

(30) Foreign Application Priority Data

May 29, 2009   (SE) ........................... 0900729

(51) Int. Cl.
*G01B 7/14*    (2006.01)
(52) U.S. Cl.
USPC ............... 428/35.8; 428/35.7; 324/207.21; 324/207.12; 324/207.24
(58) Field of Classification Search
USPC .............. 428/35.7, 34.2, 35.8; 324/219, 260, 324/207.21, 207.12, 207.24
See application file for complete search history.

(56) References Cited

U.S. PATENT DOCUMENTS

| 7,765,775 B2 | 8/2010 | Nilsson et al. |
| 2005/0287351 A1 | 12/2005 | Johansson et al. |
| 2006/0032928 A1 | 2/2006 | Schaedel |
| 2008/0309327 A1* | 12/2008 | Holmstrom ............. 324/207.21 |
| 2009/0000250 A1 | 1/2009 | Nilsson et al. |
| 2010/0139216 A1 | 6/2010 | Johansson et al. |

FOREIGN PATENT DOCUMENTS

| EP | 0 705 759 A1 | 4/1996 |
| WO | WO 97/24278 A1 | 7/1997 |
| WO | WO 03/095198 A1 | 11/2003 |
| WO | WO 2006/093447 A1 | 9/2006 |
| WO | WO 2006/135315 A1 | 12/2006 |

OTHER PUBLICATIONS

International Search Report (PCT/ISA/210) issued on Aug. 25, 2010, by Swedish Patent Office as the International Searching Authority for International Application No. PCT/SE2010/000122.
English translation of Substantive Objections of an Official Action issued by the Chinese Patent Office on Nov. 2, 2012 in Chinese Patent Application No. 201080022822.X (2 pages).

* cited by examiner

*Primary Examiner* — Ellen S Raudenbush
(74) *Attorney, Agent, or Firm* — Buchanan Ingersoll & Rooney P.C.

(57) ABSTRACT

A packaging material comprising a plurality of magnetizable portions thereon comprising at least one spot per package to be formed from the packaging material is disclosed. At least one of the magnetizable portions provides a magnetic mark carrying a magnetic field pattern. The magnetic field pattern comprises a first magnetic field peak having a first polarity and a second magnetic field peak having a second opposite polarity.

12 Claims, 5 Drawing Sheets

PACKAGING MATERIAL COMPRISING MAGNETISABLE PORTIONS

TECHNICAL FIELD

The present invention relates to a packaging material comprising magnetisable portions, wherein the material is intended for forming e.g. food packages.

BACKGROUND

Within packaging technology where a packaging container is formed from a packaging material, it is known to provide the packaging material as a web which prior or during packaging is formed to the packaging container. Guiding marks, e.g. for optical reading has been provided to guide operations when finishing the package, such as forming, sealing, folding, etc. Such guiding marks are sometimes referred to as register marks. The register mark for optical reading is provided during printing of the packing material, where e.g. decoration or product information is printed on the packaging laminate. A problem with such register marks is that they consume a non-negligible area of what becomes the exterior of the package. A further problem is that such a register mark has to rely on the printing being well aligned with other operations performed on the web. It is therefore a desire to provide an improved provision of marking of web of packaging material.

SUMMARY

The present invention is based on the understanding that magnetic marking can be provided on a packaging material. Storing information in a magnetic recording medium in packing material has been suggested in e.g. EP 705759 A1. In the present disclosure, it is suggested that one or more spots per intended package to be formed from the web is provided on the web, wherein the spots comprises magnetisable particles such that magnetic marking is enabled.

According to a first aspect, there is provided a packaging material comprising a plurality of magnetisable portions thereon comprising at least one spot per package to be formed from the packaging material. At least one of the magnetisable portions provides a magnetic mark carrying a magnetic field pattern. The magnetic field pattern comprises a first magnetic field peak having a first polarity and a second magnetic field peak having a second opposite polarity, —can be inexpensively magnetised by a permanent magnet . . . .

The material may define a transversal direction being parallel to an imaginary axis of a roll when a web of the material is spooled, a longitudinal direction perpendicular to the transversal direction, and an imaginary line between a midpoint of the first peak and the second peak of the magnetic field pattern, wherein the magnetic field pattern may be arranged such that the angle between the imaginary line and the longitudinal direction is between −10 and 10 degrees, preferably between −5 and 5 degrees, preferably about 0 degrees. The peaks of the magnetic pattern may have a distribution forming a substantially constant magnetic field along a width of the magnetic pattern in a direction perpendicular to the imaginary line, and forming a strongly decreasing magnetic field outside the width of the magnetic pattern in the direction perpendicular to the imaginary line. The width may be at least 2 mm, preferably at least 4 mm, preferably at least 6 mm.

The second magnetic field peak may be distributed such that it encircles the first peak in the plane of the material and has a second opposite polarity to the first magnetic field peak.

The magnetic field pattern may define a position in a plane of the material. The position may be defined in relation to a preparation feature for enhancing finishing of packages, wherein the preparation feature comprises any of a group comprising crease lines, openings, perforations, package boundary or sealing, beginning of web, end of web, positioning of optical mark, print for package outside. A distance between an area of a preparation feature and its aligned magnetic field mark may be at least 2 mm, preferably at least 5 mm, preferably at least 7 mm, preferably at least 10 mm.

At least one of the magnetic marks for a package to be formed may be positioned not more than 20%, preferably between 5 and 15% of the width of the material to form a package from a longitudinal edge of the material to form the package.

DETAILED DESCRIPTION

Figure 1:
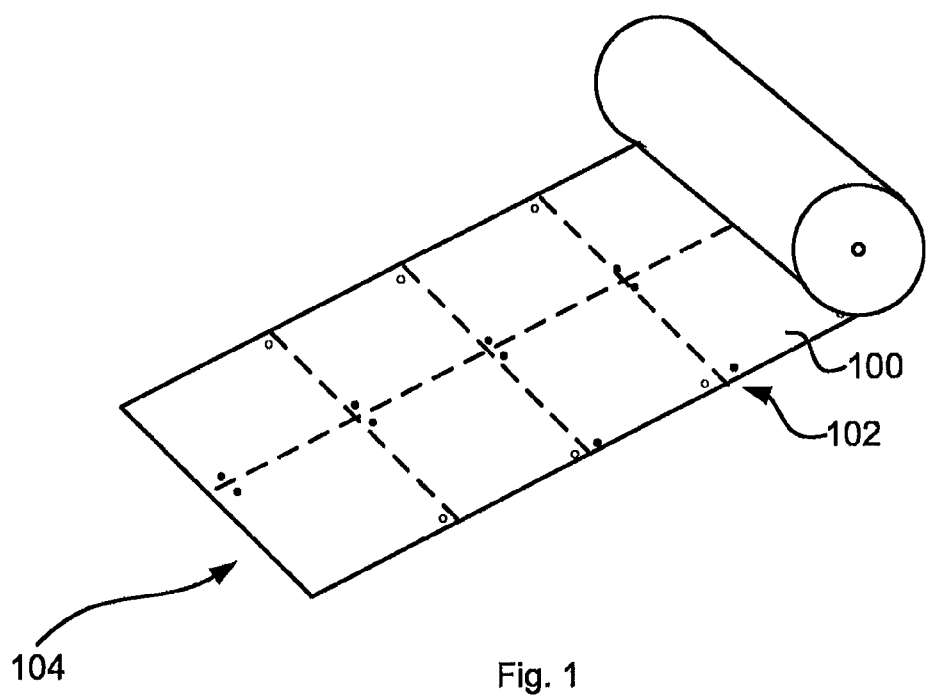
FIG. 1 schematically illustrates a web of packaging laminate according to an embodiment.

FIG. 1 illustrates web 100 of packaging material, where a plurality of magnetisable portions 102 are provided. The magnetisable portions are preferably distributed upon printing them such that there is at least one magnetisable portion 102 per package 104 to be formed from the packaging material. The dashed lines are imaginary and are intended to show the plurality of parts that will form the packages. For reducing the consumption of the magnetic material, i.e. magnetisable ink consumption, the magnetisable portions are provided as spots or the like at parts where magnetic marks are intended to be positioned. Since there is a limited precision in positioning between printing and the assignment of the magnetic mark, cf. the problem with optical marks, the spots are preferably slightly larger than the actual size needed for the magnetic mark. Thus, any reasonable deviation can be handled. The spots are thus provided with magnetisable particles, which can be provided with magnetic marks, and, as will be further elucidated below, depending on the form and size of the spots, be provided with more complex information by modulated magnetisation. The packaging material is preferably a laminate, or a single layer material such as a polymer material.

Figure 2:
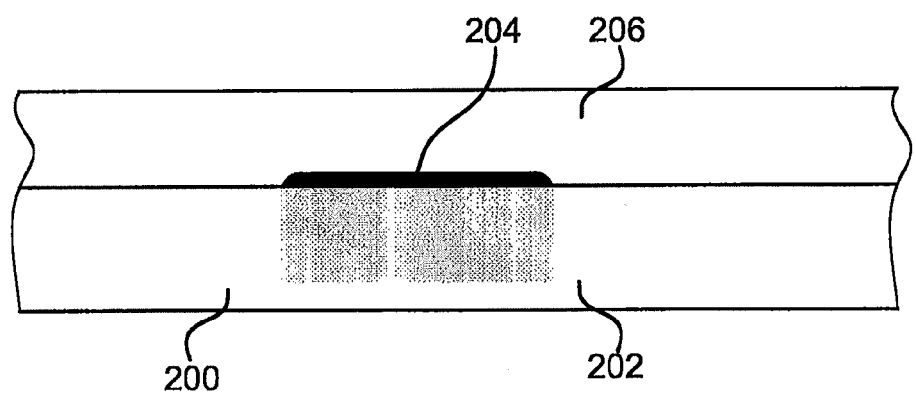
FIG. 2 illustrates an example of laminate structure.

FIG. 2 illustrates that the packing laminate 200 can comprise a layer of paper 202, on which the printing of the magnetisable portions 204 can be made, and one or more layers of plastic coating 206. Here, the term plastic coating should be construed as any coating including suitable polymers for food containers. The packing laminate can also comprise a metal foil layer. To be able to write and read the magnetic mark through the metal foil layer, the metal is preferably non-ferromagnetic, such as aluminium. The print of the magnetisable portions is preferably made on a side of the layer it is printed on of the laminate facing towards the intended interior of the package to be formed. Thus, it does not interfere with exterior printing of e.g. decorations or product information on the package. The print is preferably made by using a magnetisable ink as demonstrated above, and such that the print becomes between 4 and 10 µm thick when dried, preferably between 6 and 8 µm.

Figure 3:
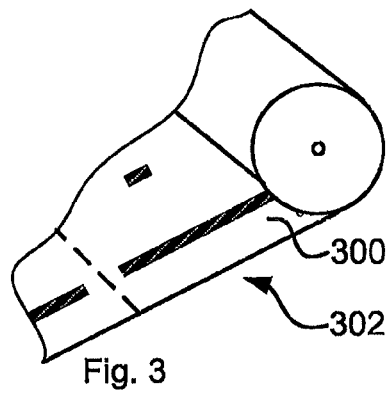
FIG. 3 schematically illustrates a web of packaging laminate according to an embodiment with regard to positions of magnetisable portions.
Figure 4:
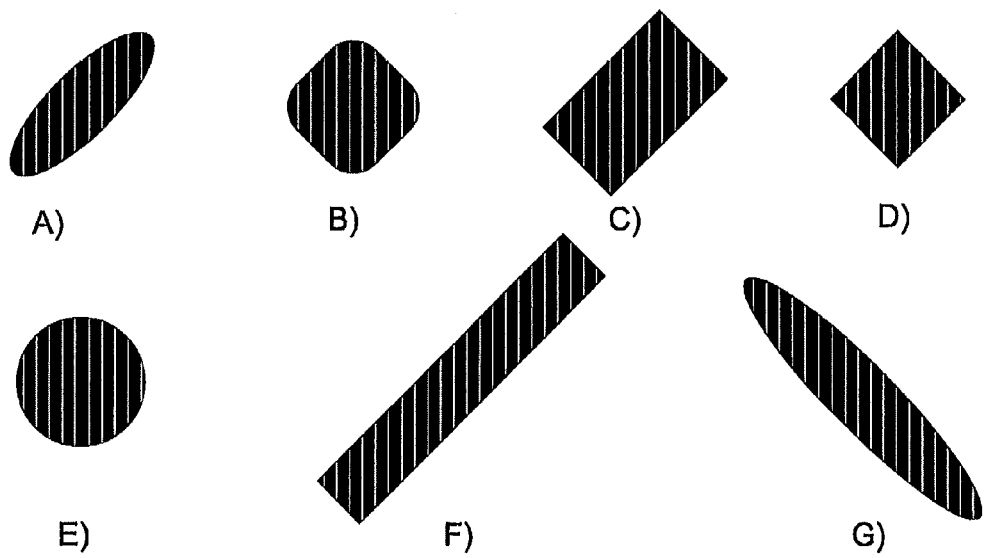
FIG. 4 illustrates different examples of shapes of magnetisable portions.

FIG. 3 illustrates a web of packaging material 300, comprising a plurality of magnetisable portions 302. The magnetisable portions can be distributed such that there is at least one or more magnetisable portions per package to be formed from the packaging material 300. The magnetisable portions comprise magnetisable particles, e.g. provided by a magnetic ink as demonstrated above. The magnetisable portions or "spots" can have a variety of shapes, as illustrated in FIG. 4, depending on the magnetic mark and the intention of the magnetic mark it is supposed to carry. The spots can be square, rectangular, circular, oval, or have an elongated shape being oriented in a longitudinal or transversal direction of the web. The size of the spot is chosen depending on the size of the mark it is supposed to carry. Preferably, the size of the spot is slightly larger to alleviate any problem in positioning deviation between printing of the spot and providing the magnetic mark to it. A larger spot is of course able to carry more magnetisation, which can be used for increasing magnetic field of a low-information carrying mark which thus will be easier to read, especially under harsh signal conditions, or be provided with more complex information, such as carrying information about the web or the particular part of the web. For a low-information carrying mark, the spot can have an area of 250 mm$^2$ or less, which for a square spot equals a side of about 15-16 mm, or a circular spot with a diameter of about 17-18 mm. For many applications, an area of 150 mm$^2$ or less is enough, and for some applications, an area of 25 mm$^2$ or even less may be sufficient. A magnetisable portion for carrying complex data, an elongated spot or bar can be suitable. By providing the elongated portion such that it stretches along a longitudinal direction of the web, sequential writing and reading of the complex data is neatly enabled as the web moves during manufacturing of the web and/or finishing of the packages.

The printed spots preferably comprise an amount of magnetic particles of between 0.5 and 4 g per m$^2$ spot area. Lower amounts may reduce ability to provide the magnetic information, and higher amounts may only increase consumption of magnetisable ink without improving the information carrying abilities. Printing larger amounts may also be a problem, especially at high-speed printing, since the ink may cause problems with setting-off. A preferable amount is between 1.5 and 4 g per m$^2$ to ensure information carrying abilities under various conditions. A fair trade-off of secure reading/writing, printing, and economy in ink consumption gives about 2 g per m$^2$.

The positioning of an elongated spot or bar can be positioned a predetermined distance from a longitudinal border of the web, wherein the data provided in the bar also can be used for alignment of the web in some applications.

The elongated spot or bar can be part of a strip along the web, being piecewise divided such that there is one part present for each package to be formed. The division is preferably positioned such that sealing of the package to be formed is enabled at the position of the division where there is no magnetisable print. The strip can have a magnetic mark indicating the sealing position by being arranged at a predetermined distance from the sealing position.

Figure 5:
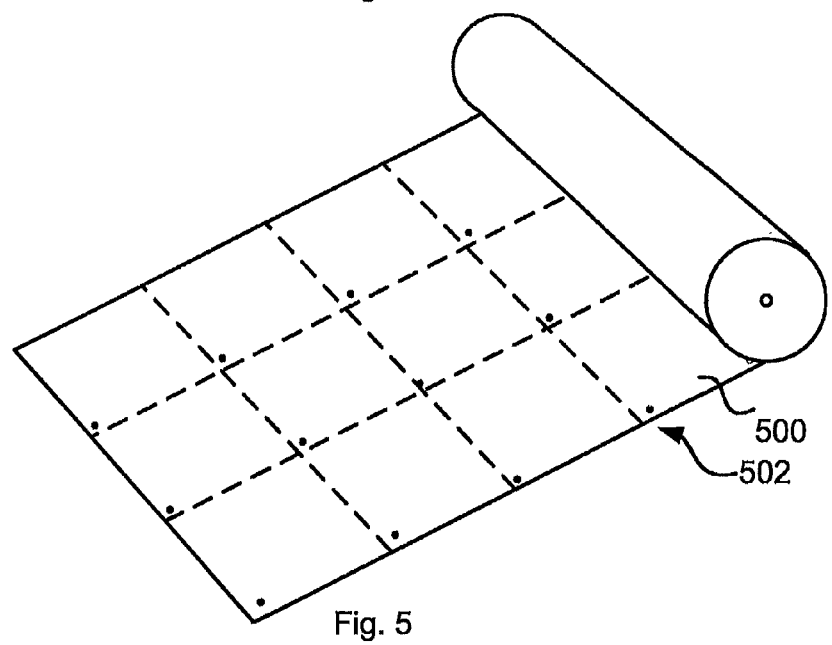
FIG. 5 schematically illustrates a web of packaging laminate according to an embodiment.

FIG. 5 illustrates a web 500 of packaging material comprising a plurality of magnetisable portions 502 thereon, here illustrated as dots. The web 500 is intended to form a plurality of packages for packaging of e.g. food or liquids. The dashed lines are imaginary and are intended to show the plurality of parts that will form the packages. The web 500 comprises at least one magnetisable portion per package. Thus, when the packages are formed from the packaging material, each package will have at least one magnetisable portion each. The spots preferably have any suitable combination of features according to what have been demonstrated above with reference to the geometry, printing, and the magnetisable ink.

Figure 6:
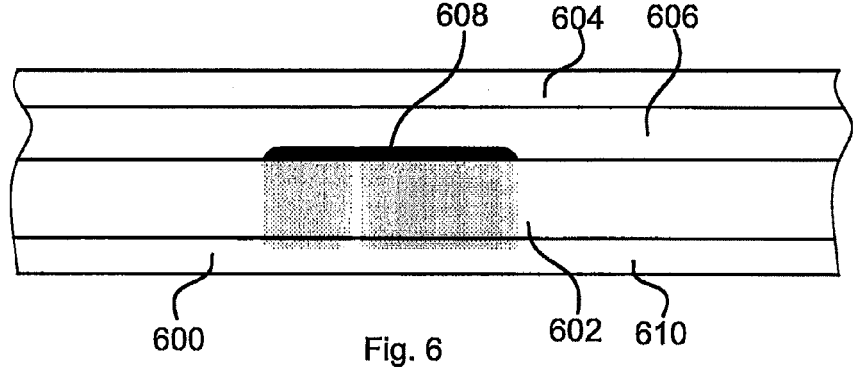
FIG. 6 illustrates an example of laminate structure.

The material can be a laminate, e.g. a complex laminate comprising a plurality of layers, where each layer is selected for providing the final package the desired properties. For example, a further polymer layer 610 can be provided, e.g. to protect the paper layer from moisture, make the final package easier to handle and more rough to exposure from the environment, and/or simply to make the final package have a nicer appearance. The laminate can also comprise a single layer, although denoted as a laminate, if that provides the final package its desired properties, such as a single polymer layer. The laminate 600 can comprise a first layer 602 of paper and a second layer 604 of plastic coating, as illustrated in FIG. 6. The magnetisable portions can then be prints 608, e.g. in form of the spots or other shapes as demonstrated above with reference to the geometry, made on the layer of paper. There can also be further layers, such as a third layer 606 of metal foil. Further or fewer layers of different materials can be provided to give the desired properties of the final package. When the laminate comprises a metal foil layer 606, it is preferably made of a non-ferromagnetic metal, such as aluminium, such that the magnetisable portion is electromagnetically accessible through the metal foil for printing and reading of the magnetically stored information and/or position.

At least some spot of that/those which is/are present on each package is printed such that it is not visible from outside on the final package. That can for example be for the reason that the exterior of the package should be available for decoration and/or product information. Thus, the print is preferably made on the side of the web intended to face to the interior of the package, or at least on the side of a suitable layer, such as the paper layer as demonstrated above, intended to face towards the interior of the package.

Figure 7:
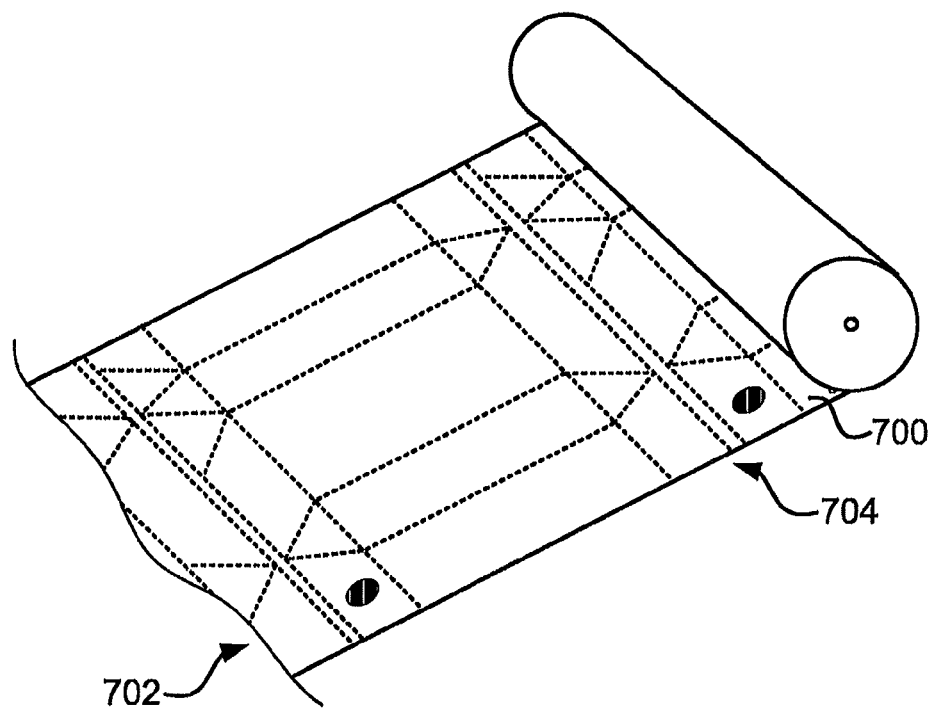
FIG. 7 schematically illustrates a web of packaging laminate according to an embodiment.

FIG. 7 illustrates a web 700 of packaging laminate comprising a plurality of magnetisable portions 702 thereon. The web 700 comprises at least one spot per package to be formed from the packaging laminate. Further, at least one preparation feature for enhancing finishing of packages is provided by the web. The at least one preparation feature is aligned with a magnetic field mark in the at least one magnetisable portion. For example, as illustrated in FIG. 7, crease lines are made in the web for enabling a swift and reliable finishing of the package. Upon making the crease lines, a mark, formed as a predefined magnetic field, in the magnetisable portion simultaneously with the making of the crease lines. The mechanism for making the crease lines, i.e. rolls with patterned grooves/protrusions, can be provided with a magnetising element. The magnetic mark will then be ensured to be aligned with the crease line making operation. The magnetising element can be a permanent magnet, or an electromagnet, for providing the magnetic field mark. When the magnet provided at the periphery of a crease roll comes in close vicinity of the magnetisable portion, the magnetisable particles of the magnetisable portion will be magnetised, and a magnetic field pattern will remain at the magnetisable portion. Thus, a magnetic field mark is provided. Preferably, the magnetisable portion is slightly larger than the geometric size of the magnetic field mark, i.e. the part of the magnetisable portion having a remaining magnetism. Thereby, the alignment of the magnetisable portion is not crucial as the magnetic field mark will be the element providing an accurate position, and not the print of the magnetisable portion itself. By provision of a suitable magnetic pattern, the accurate magnetic field mark can also be accurately read, as will be discussed further below.

The preparation feature can be other than provision of crease lines, such as providing openings, perforations, etc. The alignment follows the same principle, i.e. that the magnetising portion is provided at the mechanism providing the preparation feature such that the alignment will be inherent because of the structure.

The application of the magnetising element in the mechanism performing the preparation feature may arise a few issues. The magnetising element may for example not be provided at a position where the preparation feature demands a mechanical interaction with the packaging laminate, such as forming a crease line or punching a hole. Therefore, there is preferably provided a distance between an area of such a preparation feature and its aligned magnetic field mark. Further, the tool performing the interaction as mentioned above may be made of a ferromagnetic material. To improve the application of the magnetic field mark, the magnetising element may need to be provided with a holding or mounting means made of a non-ferromagnetic material, such as aluminium, wherein the distance may be further increased. Thus, depending on the preparation feature operation, and the tool for performing it, the distance is preferably for example at least 5 mm, at least 7 mm, or at least 10 mm.

As several operations performing feature preparations, it is preferable that each such operation have its aligned magnetic field mark. Those different magnetic field marks are each preferably made in a respective magnetisable portion adapted in position for the operation. As some operations may be interacting, one operation can use a magnetic field mark made by another operation as a master mark, or there may be provided a certain dedicated master mark that is not inherently aligned with any feature preparating operation, which thus only is used for reference by later performed operations.

Other magnetic field marks may hold complex data, and can for example be provided as long rectangular spots, i.e. as strips. The strips can be provided along the entire web, with or without interruptions at parts intended to be cut upon finishing the packages. The magnetic field marks holding complex data can for example provide a unique code from which the web, and also the part of the web, can be identified. The complex data can also give position information, indications for the finishing of the package, etc.

Figure 8:
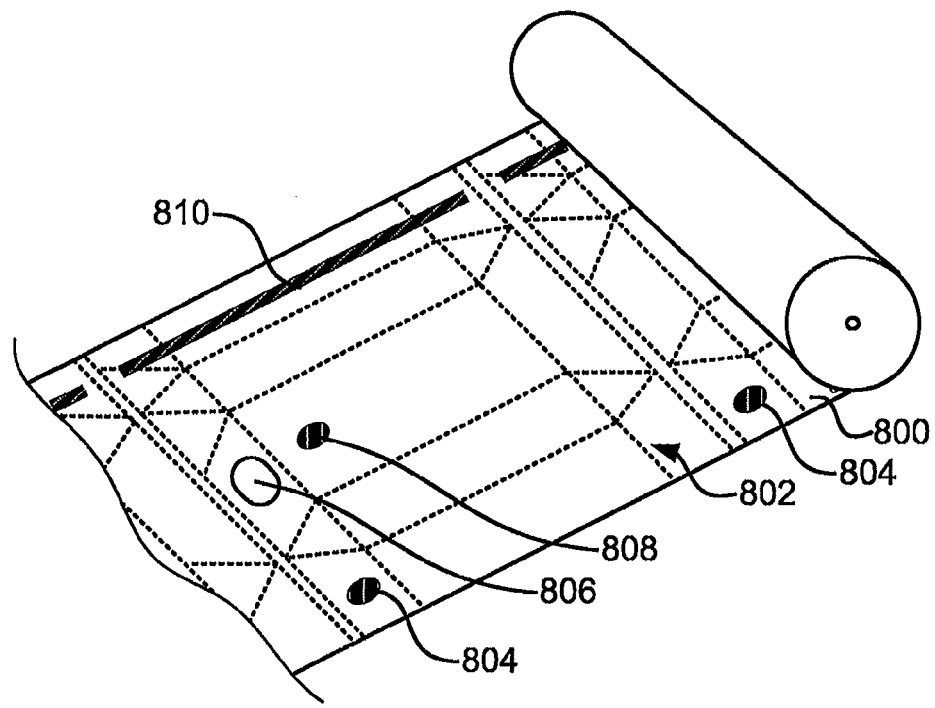
FIG. 8 schematically illustrates a web of packaging laminate according to an embodiment.

FIG. 8 illustrates an example of a web 800 comprising crease lines 802 and a magnetisable portion 804 holding position information for the crease lines by an aligned magnetic field mark. The web 800 also comprises a punched hole 806 for each package to be formed, and a magnetisable portion 808 holding position information for the respective punched hole 806 by an aligned magnetic field mark. This magnetic field mark can for example be used upon moulding a re-closable opening on the package upon finishing. The web 800 also comprises a strip 810 holding complex data, for example as elucidated above.

A further position information can be package boundary or sealing, where an operation is for dividing the web into the parts forming the package, or for the sealing of respective package.

A further position information, that the magnetisable portion can hold, is magnetic position marks at ends of a web of the packaging material, i.e. beginning of web and/or end of web, such that, at splicing of the webs, the splice is enabled to be aligned.

A further position information is positioning of an optical mark, which may beneficial compatibility for packaging machines having either optical reading or magnetic reading of positioning information. Preferably, the position of the spot holding this information is positioned similar to the optical mark, but on the side that is intended to become the inside of the package. Since the optical marks normally are provided on the part intended to form the bottom of the package, the corresponding magnetisable portion is positioned accordingly. A magnetic mark at this magnetisable portion is thus enabled to provide the similar information as the optical mark, and the optical reader of a packaging machine can thus simply be replaced with a magnetic reader. In practise, no optical mark is thus necessary if the optical readers are replaced by magnetic readers, and the magnetic mark takes the place of the optical mark as described above. In that case, the compatibility lies in the sense of the same mounting position of the readers in the packaging machine.

A further position information can be for a print for the package outside. This position information can be beneficial for ensuring proper alignment of the print with the package, and with other feature preparations of the package.

Upon making the magnetic, field mark, it can be beneficial that the means for writing the magnetic field mark, e.g. a permanent magnet or a coil arrangement, has no or little relative movement, or at least an approximately constant relative movement to the magnetisable portion. This is achieved for example by integrating the writing means in e.g. rolls for making the crease lines, wherein there is no relative movement since the periphery of the rolls and the web moves by the same speed in the same direction. Another way of achieving no or little relative movement, or at least an approximately constant relative movement to the magnetisable portion is to control the movement at the position of the writing. This can be done by having a slacking portion of the web both before and after the writing position such that speed at this position can be controlled irrespective of the speed of the web before and after that position. The slack can be achieved by letting the web move along a wave-formed path where the sizes of the waves are adaptable to give a variable slack. Thus, during the writing operation, the speed can be controllable at the writing position, and the web is accelerated or decelerated between the writing operations to adapt to the average speed of the web.

At least one of the spots for each package to be formed can be positioned not more than 20%, preferably between 5 and 15% of the width of the material to form a package from a longitudinal edge of the material to form the package. A magnetic field mark at such spots can then be used for controlling twisting of the material when forming the package. The forming of the package is normally made by forming some kind of tube which then is sealed in some way at its ends and formed into the desired shape. The tube can then be unintentionally twisted, which can jeopardize the forming of the package. Therefore, such a magnetic field mark can help to control any twisting of the tube to ensure forming of the package. By having these magnetic marks relatively close to the longitudinal edges to be joined to form the tube, the control is further enhanced since the reading of the magnetic field marks can be made from the side of the package where the joining takes place.

Considering a packaging material comprising a plurality of magnetisable portions thereon, wherein at least one spot per package to be formed from the packaging material is comprised, at least one of the magnetisable portions can provide a magnetic mark carrying a magnetic field pattern. Thus, the magnetic mark becomes an information carrier. The information carried is geometrical in the sense that it is made on a particular position on the web, which is maintained through different processing steps, from manufacturing of the material to the finishing of the package. The information can also be in the sense of a pattern of the magnetic field, which can be a pattern for reliable position detection.

Figure 9:
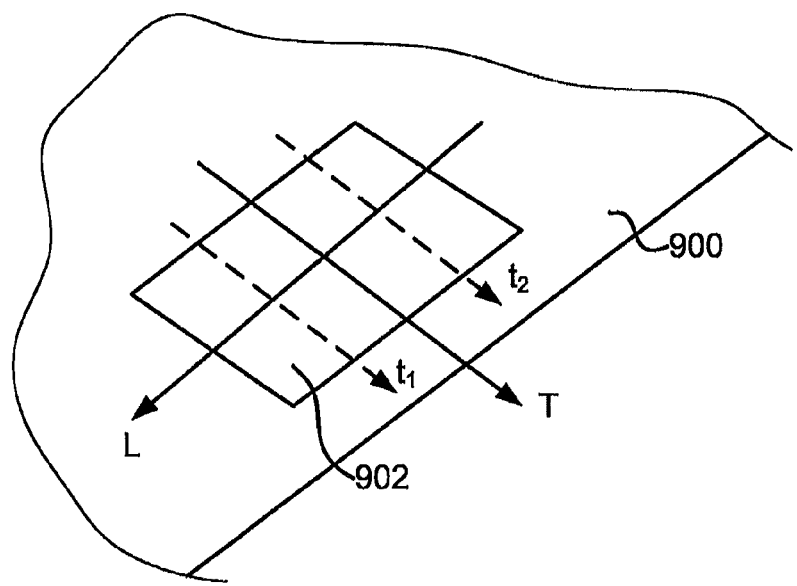
FIG. 9 schematically illustrates a magnetisable portion according to an embodiment.

Some examples of magnetic field patterns will be discussed with reference to FIG. 9, which illustrates a part of a web 900 of packaging material with a magnetisable portion 902. A transversal direction T, defined as being parallel to an imaginary axis of a roll when the web is spooled, and a longitudinal direction L perpendicular to the transversal direction can be defined, and transversal lines $t_1$ and $t_2$ are assigned for illustration of exemplary magnetic fields in FIGS. 10 and 11.

Figure 10A:
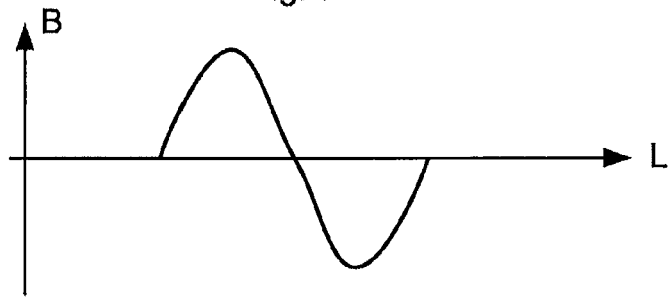
FIGS. 10a to 10c are diagrams illustrating magnetic field pattern according to an embodiment.
Figure 10B:
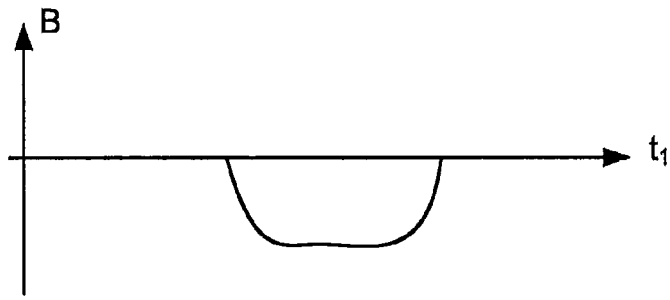
Figure 10C:
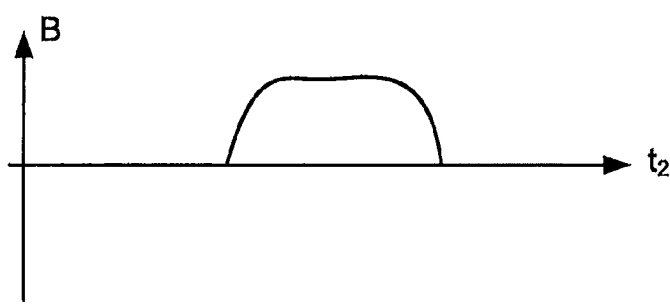

The magnetic field pattern comprises a first magnetic field peak having a first polarity and a second magnetic field peak having a second opposite polarity. FIG. 10 illustrates an example of this, where FIG. 10a is a diagram illustrating the magnetic field pattern along the longitudinal direction L, FIG. 10b is a diagram illustrating the magnetic field pattern along line $t_1$, and FIG. 10c is a diagram illustrating the magnetic field pattern along line $t_2$. Such a magnetic field pattern can be achieved by a single magnet, e.g. a permanent magnet having a north and a south pole, being arranged close to the magnetisable portion during application of the magnetic mark, wherein the remaining magnetic field of the magnetic particles of the magnetic ink of the magnetisable portion becomes for example like the one illustrated by FIG. 10. The position in the longitudinal direction L is then preferably detected by observing the shift of the magnetic field, which will provide a very accurate position indication in the longitudinal direction L. The position in the transversal direction T is preferably detected by observing the flanks of the magnetic field, e.g. by differential measurements technique, which will enable accurate tracking in the transversal direction T.

The pattern illustrated in FIG. 10 is perfectly aligned with the directions T and L. However, such a perfect alignment is not necessary. Considering an imaginary line between a midpoint of the first peak and the second peak of the magnetic field pattern, the magnetic field pattern can be arranged such that the angle between the imaginary line and the longitudinal direction L is between −10 and 10 degrees. In a preferred embodiment, the angle is between −5 and 5 degrees. For many applications however, the angle is preferably about 0 degrees as illustrated in FIG. 10. The peaks of the magnetic pattern have a distribution forming a substantially constant magnetic field along a width of the magnetic pattern in a direction perpendicular to the imaginary line, and forming a strongly decreasing magnetic field outside the width of the magnetic pattern in the direction perpendicular to the imaginary line, e.g. as illustrated in FIGS. 10b and 10c. The width is preferably at least 2 mm to enable detection of the flanks without interference. For higher reliability, the width is preferably at least 4 mm, and for some applications preferably at least 6 mm.

Figure 11A:
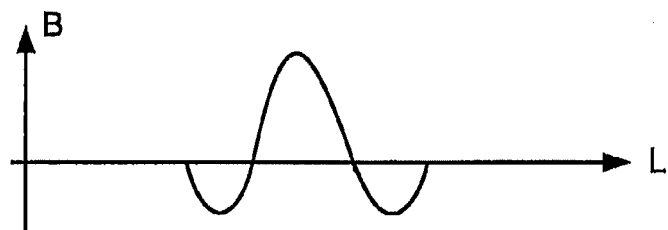
FIGS. 11a and 11b are diagrams illustrating magnetic field pattern according to an embodiment.
Figure 11B:
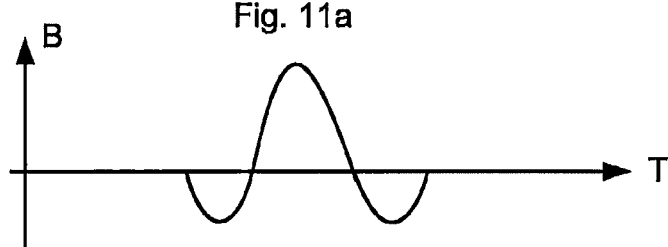

According to another embodiment of assignment of magnetic field pattern, as is illustrated in FIG. 11, the magnetic field pattern comprises a first magnetic field peak having a first polarity and a second magnetic field peak being distributed such that it encircles the first peak and having a second opposite polarity. Observing this magnetic field pattern in directions T and L will show the symmetric properties of the magnetic field pattern. Thus, detection according to the same principle can be made in any direction. For example, the two zero-crossings of the magnetic field can be observed using differential measurement technology. Another example is simply observing the main center peak of the magnetic field pattern.

Figure 12A:
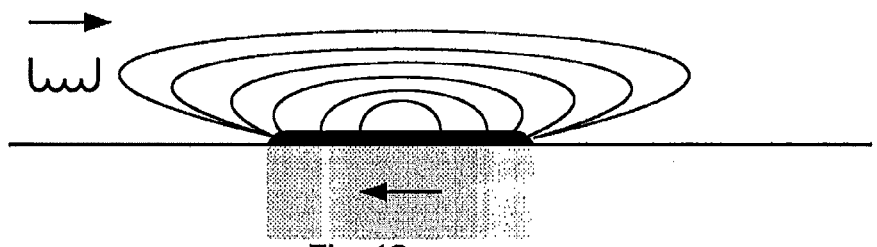
FIGS. 12a to 12c schematically illustrate reading of a magnetic field pattern according to embodiments.
Figure 12B:
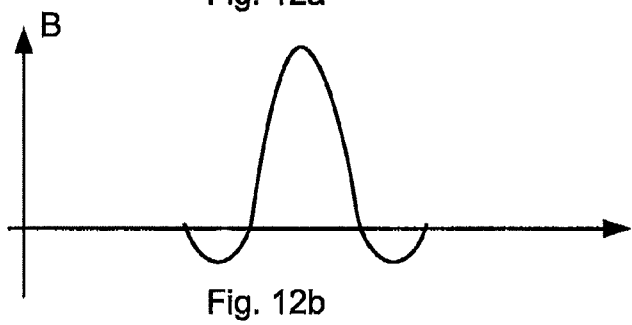
Figure 12C:
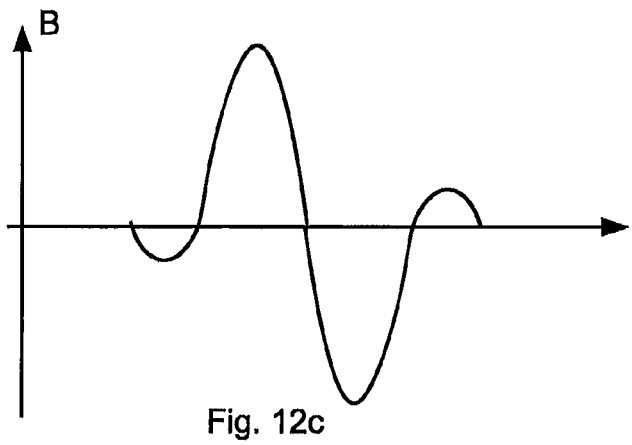

In practise, when reading a magnetic mark, the reading means, such as a coil arrangement, passes relative to the packaging material, the magnetic field lines from a magnetic mark, as illustrated in FIG. 12a, having its poles in the direction of the relative movement will provide a reading like illustrated in FIG. 12b. By providing two reading means slightly separated in the direction of the relative movement and taking a differential signal from them, the reading will instead be like illustrated in FIG. 12c. From this reading, a less error prone result of detecting a position can be achieved. Also, a magnetic mark as the one illustrated in FIG. 12a can be arranged to provide one bit of information by selecting the direction of the polarity of the magnetic mark in relation to the material. The readings will then be mirrored compared to the illustrations of FIGS. 12b and 12c. The one bit information can for example indicate a type of preparation feature of the material which the magnetic mark is aligned with.

The invention claimed is:

1. A packaging material comprising a plurality of magnetisable portions printed thereon comprising
   at least one spot per package to be formed from the packaging material, the package possessing a bottom and a top,
   wherein at least one of the magnetisable portions provides a magnetic mark carrying a magnetic field pattern,
   wherein the magnetic field pattern comprises a first magnetic field peak having a first polarity and a second magnetic field peak having a second opposite polarity,
   the packaging material having a longitudinal direction defined in parallel with a flange or joint connecting the bottom and the top of the package, a transversal direction perpendicular to the longitudinal direction, and an imaginary line between a midpoint of the first peak and the second peak of the magnetic field pattern,
   wherein the peaks of the magnetic pattern have a distribution forming a substantially constant magnetic field strength along a width of the magnetic pattern in a direction perpendicular to the imaginary line, and forming a strongly decreasing magnetic field strength outside the width of the magnetic pattern in the direction perpendicular to the imaginary line, and
   wherein the magnetic field pattern is arranged such that the angle between the imaginary line and the longitudinal direction is between −10 and 10 degrees.

2. The material according to claim 1, wherein the width is at least 2 mm.

3. The material according to claim 1, wherein the second magnetic field peak is distributed such that it encircles the first peak in the plane of the material and has a second opposite polarity to the first magnetic field peak.

4. The material according to claim 1, wherein the magnetic field pattern defines a position in a plane of the material.

5. The material according to claim 4, wherein the position is defined in relation to a preparation feature for enhancing finishing of packages, wherein the preparation feature comprises any of a group comprising crease lines, openings, perforations, package boundary or sealing, beginning of web, end of web, positioning of optical mark, print for package outside.

6. The material according to claim 5, wherein a distance between an area of a preparation feature and its aligned magnetic field mark is at least 5 mm.

7. The material according to claim 1, wherein at least one of the magnetic marks for a package to be formed is positioned not more than 20% of the width of the material to form a package from a longitudinal edge of the material to form the package.

8. The material according to claim 1, having a longitudinal direction defined in parallel with a flange or joint connecting bottom and top of the package, a transversal direction perpendicular to the longitudinal direction, and an imaginary line between a midpoint of the first peak and the second peak of the magnetic field pattern, wherein the magnetic field pattern is arranged such that the angle between the imaginary line and the longitudinal direction is about 0 degrees.

9. The material according to claim 1, wherein the width is at least 6 mm.

10. The material according to claim 5, wherein a distance between an area of a preparation feature and its aligned magnetic field mark is at least 10 mm.

11. The material according to claim 1, wherein at least one of the magnetic marks for a package to be formed is positioned not more than between 5 and 15% of the width of the material to form a package from a longitudinal edge of the material to form the package.

12. The material according to claim 1, wherein at least one of the magnetic marks for a package to be formed is positioned not more than 20% of the width of the material to form a package from a longitudinal edge of the material to form the package.

* * * * *